April 21, 1936.  G. R. BOTT  2,038,095

RETAINER FOR ANTIFRICTION BEARINGS

Filed Feb. 23, 1935  2 Sheets-Sheet 1

INVENTOR.
George R. Bott
BY C. P. Goepel
his ATTORNEY.

April 21, 1936.  G. R. BOTT  2,038,095
RETAINER FOR ANTIFRICTION BEARINGS
Filed Feb. 23, 1935  2 Sheets-Sheet 2
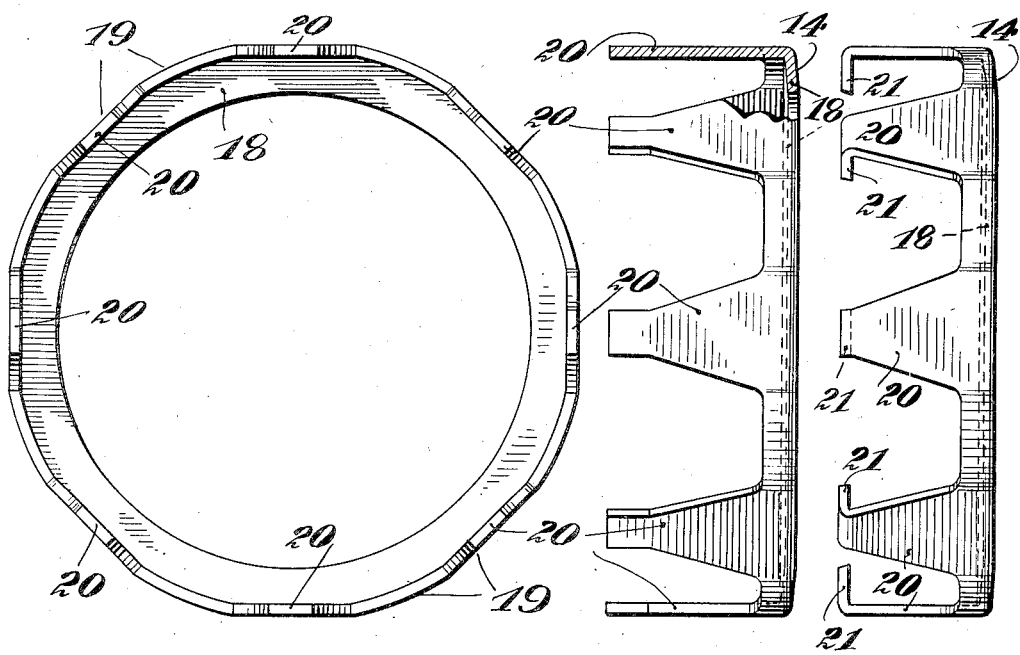
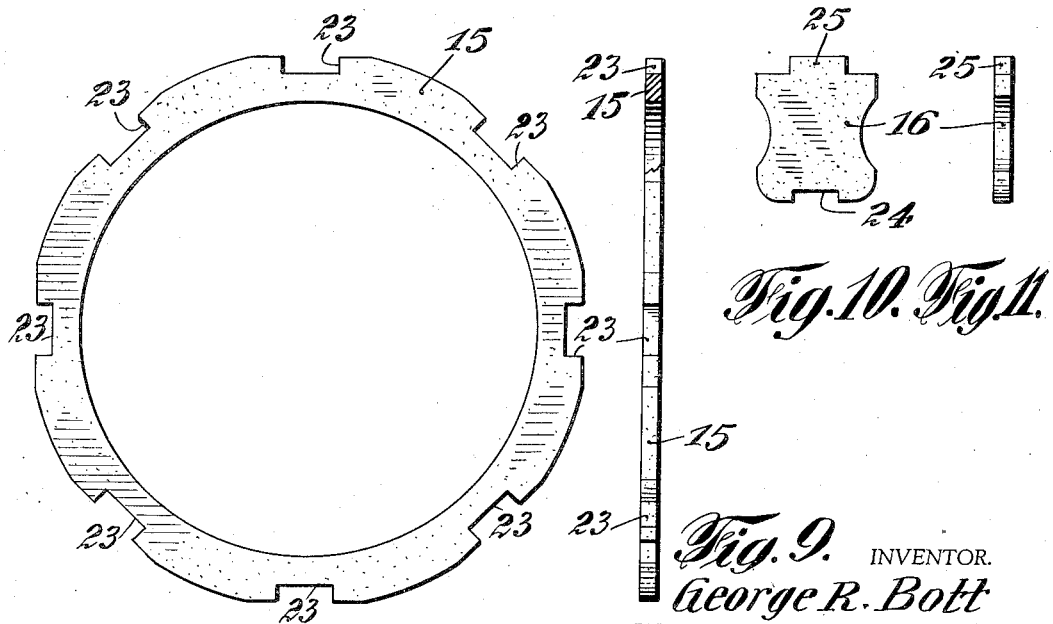
INVENTOR.
George R. Bott
BY
his ATTORNEY.

Patented Apr. 21, 1936

2,038,095

UNITED STATES PATENT OFFICE 2,038,095

RETAINER FOR ANTIFRICTION BEARINGS

George R. Bott, Stamford, Conn., assignor to Norma-Hoffmann Bearings Corporation, Stamford, Conn., a corporation of New York Application February 23, 1935, Serial No. 7,878

7 Claims. (Cl. 308—201)

This invention relates to retainers for antifriction bearings, together with a method for manufacturing and assembling the retainers.

An object of this invention is to provide an improved method for producing retainers for ball bearings which are so constructed as to reduce to a minimum the noise incident to the movement of the balls within the retainers.

Another object of this invention is to provide an improved method of constructing ball bearing retainers by which a non-metallic lining consisting of a synthetic resinol product such as micarta or the like, will alone contact the ball bearings or rollers, and a metallic stiffening holding member is used to hold said lining in proper position.

A further object of this invention is to provide an improved method of constructing retainers whereby the careful machining of the elements making up the retainers is eliminated, thus reducing the cost of construction and assembly thereof.

A still further object of this invention is to provide an improved type of retainer embodying a metallic shell and non-metallic ball spacing members of the interlocking type which contact with the balls and prevent contact of the balls with the metallic shell or retainer.

Still another object of the invention is the provision of an improved retainer which is so constructed that the component parts thereof may be formed by stamping and the several parts thereof locked together in a manner whereby the retainer may be readily applied or removed without the use of attachment fixtures.

With the above and other objects in view, the invention resides in the form, construction and relative arrangement of parts of an anti-friction bearing construction, as will be hereinafter more fully described, illustrated in the accompanying drawings and subsequently incorporated in the subjoined claims.

In the drawings, wherein I have illustrated a practical example of my present improvements, and in which similar reference characters designate corresponding parts throughout the several views,—

Figure 5 is a plan view of the metallic locking member;

Figure 6 is a side view thereof;

Figure 7 is a side view of Fig. 5 with the tongues bent into position;

Figure 8 is a plan view of the non-metallic disc;

Figure 9 is an end view thereof;

Figure 10 is a plan view of the non-metallic tongue-like member; and

Figure 11 is an end view of the same.

Figures 1, 2:
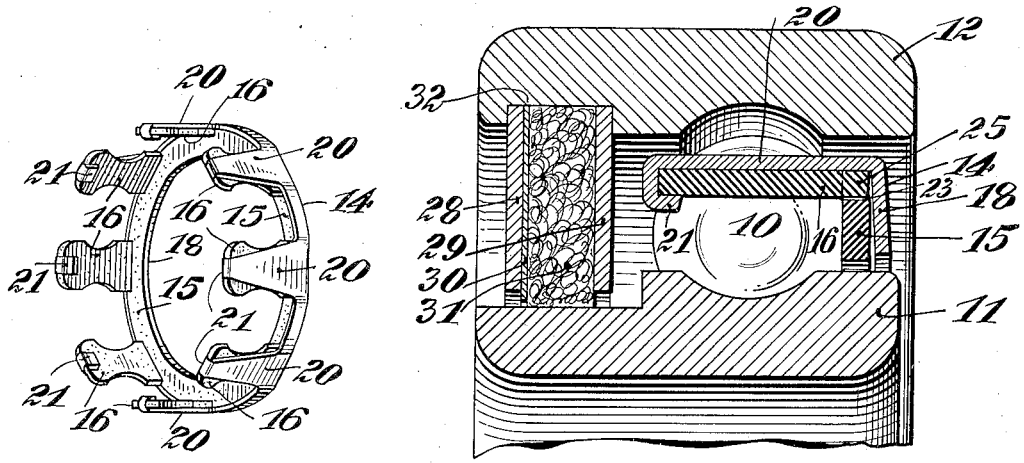
Figure 1 is a perspective view of my improved cage.
Figure 2 is a vertical section of the cage assembled with a ball bearing, the section being taken on line 2—2 of Fig. 3.

Referring in detail to the drawings, anti-friction balls 10 are interposed between inner and outer race members 11 and 12, respectively, as shown in Figure 2. These race members and balls are of conventional construction.

In order to provide a means whereby the balls 10 may be suitably spaced apart and held in spaced apart relation so as to eliminate noise, a retainer consisting of a metallic locking member 14, as shown in Figs. 6 and 7, and inserts 15 and 16, as shown in Figs. 8 to 11, are provided. These inserts are preferably constructed of a non-metallic lining consisting of a synthetic resinol product, known as micarta or the like.

The locking member 14 has a base portion 18 shaped to form a polygonal outer marginal portion 19. This base portion 18 is substantially at right angles to the axis of the ball bearing and it is provided with a plurality of segment locking tongues 20. These tongues 20 are adapted to be bent over at their free ends to form lugs 21. To facilitate this bending over, the lugs 21 terminate in end parts having parallel sides, though form is not essential. These parts preferably are made of metal.

Within this member 14 there is placed the disc 15 made of non-metallic material, such as micarta or the like, and this disc 15 has peripheral cut-out portions 23, with the remaining contour of the disc 15 shaped to conform to the shape of the member 18. The disc 15 is flat as shown in Figure 9 and is placed upon the base portion 18 of the member 14. Tongue members 16, having at one end a recess 24 and at the other end a tongue 25, are shown in Figures 10 and 11. When the disc 15 is placed on the base member 18, the separate tongue members 16, are then assembled by inserting the tongues 25 into the recesses 23, and the members 16 are placed against the inner sides of the metal tongues 20. The free ends thereof may then be bent over, whereby the lugs 21 engage the cut-outs 24, and hold the members 16 in position. The tips of the tongues 20 can be bent over before the disc 15 and tongue-like members 16 are assembled, as the disc and also these members can be readily assembled when the metal member is in the condition shown in Figure 7. When these parts are assembled, a structure is produced as shown in Figure 1.

Figure 3:
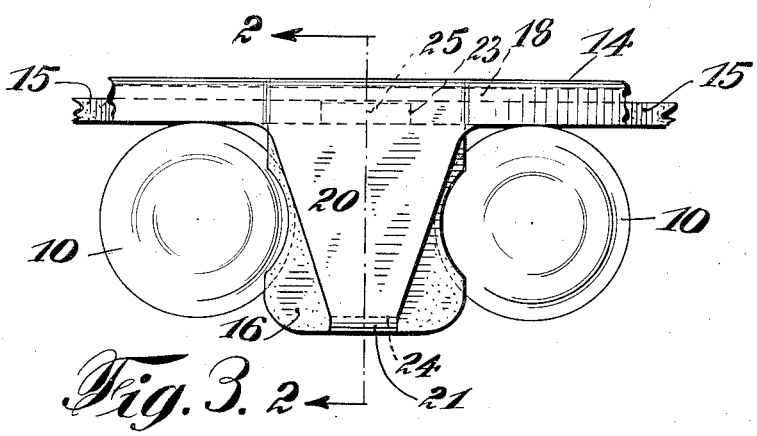
Figure 3 is a plan view of the cage shown in Fig. 2.
Figure 4:
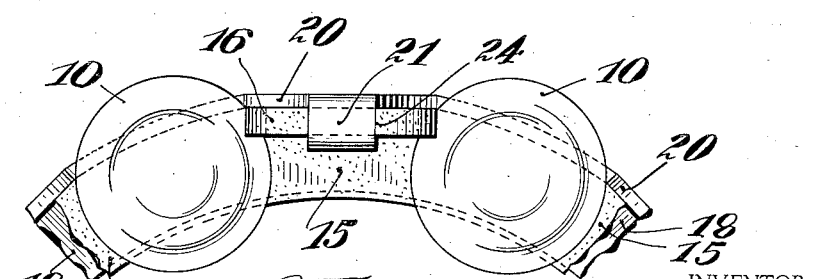
Figure 4 is an end view of the cage shown in Fig. 2.

Figures 2, 3 and 4 show different views of the novel retainer assembled with an anti-friction bearing, Figure 2 being a vertical section through the bearing taken on line 2—2 of Figure 3. It will be noted that the disc 15 and base member 18 are slightly separated from each other and this gives a certain resiliency to the disc when pressure from the balls is exerted thereon. This spacing is due to a slight outward inclination of the base member 18. The grease seal made up of two plates 28 and 29, with an intervening paper layer 30 and lubricant absorbent material 31, all placed within a recess 32 in the outer ring 12 is conventional.

The parts as shown in Figure 1, are firmly held together, and the balls do not contact with any metallic portion of the retainer. The improvement presents a quiet and wear-resisting retainer. The non-metallic as well as the metallic members are simply made on dies, thereby avoiding expensive tool room machine operations. The retainer may be applied to a ball bearing by simply snapping the retainer on the balls by finger pressure or otherwise; and may be removed in a similar manner. This is made possible by the use of resilient metallic tongues. The non-metallic parts of the retainer are stamped out from sheet micarta which is a noise-deadening medium of crystalline or brittle structure, whereas the metallic member preferably of steel, gives the strength to the retainer. These non-metallic parts are interlocked into the metallic unit, without the balls coming in contact with the metallic portions thereof. Further advantages in the invention are low cost, simple die work, locked assembly, simplified application, and removal of retainer, to and from the balls; and flexibility to accommodate small errors or variations in ball pitch diameter or assembly.

This method of constructing a retainer permits the use of relatively small pieces of non-metallic spacing members which can be suitably formed in a relatively accurate manner by stamping or die-punching, thereby eliminating a considerable amount of machine work heretofore considered necessary in the fabrication of solid micarta retainers and thus reducing the cost of the completed retainer.

The completed or assembled retainer will permit of small inaccuracies in certain of the parts of the device without any noise being apparent due to such inaccuracies.

It is of course understood that various changes and modifications may be made in the above specifically described embodiment of my invention, such changes and modifications being restricted only by the scope of the appended claims.

I claim:—

1. A retainer comprising non-metallic spacing members, a non-metallic locking ring for said spacing members, a metallic shell engaging the outer portions of said spacing members, and said locking ring, and means for securing the shell to the spacing members.

2. A retainer comprising non-metallic ball spacing members, a ring, coacting locking means carried by the ball spacing members and the ring, and a metallic shell enclosing said ring and engaging the outer surface of the ball spacing members.

3. A retainer comprising non-metallic ball spacing members interposed between pairs of balls, a ring, coacting locking means carried by the ball spacing members and the ring, a metallic ring enclosing said first ring, and supporting tongues carried by said metallic ring and engaging said spacing members to hold said spacing members against outward movement.

4. A retainer comprising a non-metallic ring, a plurality of relatively flat ball spacing members disposed at substantially right angles to a surface of said ring, coacting locking means carried by said ring and said spacing members, and a metallic shell enclosing said ring and including means engaging the outer side of said spacing members for holding said spacing members against outward movement.

5. A retainer comprising a non-metallic ring, a plurality of relatively flat ball spacing members disposed at substantially right angles to a surface of said ring, said ring having a polygonal marginal configuration, coacting locking means carried by said ring and said spacing members to hold said locking members against movement, and a shell enclosing said ring and substantially enclosing said spacing members.

6. A retainer comprising a non-metallic ring, a plurality of relatively flat ball spacing members disposed at substantially right angles to a surface of said ring, coacting locking means carried by said ring and said spacing members to hold said locking members against the outer marginal portion of said ring, and a substantially cup-shaped shell enclosing said ring and substantially enclosing said spacing members.

7. A retainer for anti-friction members comprising a metallic holding member, a plurality of separate tongues secured to the metallic holding member at right angles to said member and adapted to be disposed between adjacent anti-friction members, a non-metallic lining supported by said holding member, separate non-metallic linings of a material composed of a synthetic resinol product, said linings being arranged in respect to said metallic holding member and said tongues so as to avoid contact of any anti-friction members placed in the retainer with said metallic holding member and said tongues.

GEORGE R. BOTT.